United States Patent [19]

Helgerson et al.

[11] Patent Number: 5,558,205
[45] Date of Patent: Sep. 24, 1996

[54] CONVEYORS

[75] Inventors: David E. Helgerson, Plymouth; Brian R. Lee, Prior Lake, both of Minn.

[73] Assignee: Quickdraw Design and Drafting, Inc., Burnsville, Minn.

[21] Appl. No.: 312,300

[22] Filed: Sep. 26, 1994

[51] Int. Cl.$^6$ ........................................ B65G 13/06
[52] U.S. Cl. ........................ 198/781.04; 198/787
[58] Field of Search .......................... 198/465.3, 781.02, 198/781.04, 787

[56] References Cited

U.S. PATENT DOCUMENTS

| | | |
|---|---|---|
| 3,066,788 | 12/1962 | Christiansen . |
| 3,240,315 | 3/1966 | Dressler et al. ............ 198/465.3 |
| 3,337,023 | 8/1967 | Kohl et al. .................. 198/787 |
| 3,563,721 | 5/1968 | Ritter . |
| 3,616,892 | 11/1971 | Koennecke et al. ......... 198/465.3 |
| 4,006,815 | 2/1977 | Werntz . |
| 4,143,525 | 3/1979 | Major . |
| 4,331,228 | 5/1982 | Galarowic . |
| 4,479,572 | 10/1984 | Merz . |
| 4,781,283 | 11/1988 | Bentley et al. . |
| 4,815,588 | 3/1989 | Katsuragi et al. . |
| 4,844,231 | 7/1989 | Usui . |
| 4,930,618 | 6/1990 | Roh . |
| 4,993,541 | 2/1991 | Roh . |
| 5,040,669 | 8/1991 | Blocker . |
| 5,159,880 | 11/1992 | Mugnier .................... 198/787 |
| 5,161,673 | 11/1992 | Cairns . |
| 5,318,167 | 6/1994 | Bronson et al. . |

FOREIGN PATENT DOCUMENTS

5-294422  11/1993  Japan ...................... 198/787

*Primary Examiner*—Joseph E. Valenza
*Attorney, Agent, or Firm*—Robert C. Baker; Jeffrey A. Proehl

[57] ABSTRACT

A conveyor with a straight pathway has laterally spaced side walls with opposing banks of driven roller assemblies mounted thereon. Each roller assembly has a shaft, a roller, and a driven pulley. The pulleys of assemblies on a side wall are driven by an endless positive drive belt that has teeth for meshing with the grooves on a driven pulley. The belt is maintained in its meshed relationship with the driven pulleys by an anti-camming surface that obstructs the belt from being cammed out of its meshed relationship. The belt is laterally guided by an annular ridge on the pulleys and the outside surface of the side wall. A docking station for product carriers is also described. A transitional conveyor embodiment with a curved pathway has spaced curved alignments of bearing mounts for mounting roller assemblies thereon. The roller assemblies have dual pulleys which are each paired with the dual pulley of an adjacent assembly by an endless belt, such as an O-ring. The rotation of a primary driver pulley is thus passed from pulley to pulley along an alignment.

15 Claims, 5 Drawing Sheets

CONVEYORS

BACKGROUND OF THE INVENTION

This invention relates to roller conveyors, and more particularly to improvements in the drive systems of such conveyors.

Many different systems have been employed for driving the conveyor rollers. For example, metal chains on sprocket wheels have been used to drive the rollers, but the chains tend to be very noisy and require significant power to drive. The metal chains also cause significant vibration in the conveyor, which is especially undesirable in conveyors moving sensitive or fragile articles such as electronic components. Plastic chains, such as ladder chains, are generally quieter and less vibrational than metal chains but often lack sufficient strength to reliably drive large groups or a long series of sprocket wheels. The problem is that these ladder chains tend to break or split at or near their splicing locations as well as at their transverse crosspieces or rungs.

Frictional drive belts such as V-belts and O-rings have been used as an alternative to chains. These frictional belts generally rely solely upon friction between the belt and pulleys (connected to the conveyor rollers) to transmit power. However, frictional belts have been known to be limited in the number of pulleys that can be effectively driven by one belt without a significant drop in the rotation speed of the conveyor rollers farthest from the power source. To avoid large variations in the speed of movement of an article on the conveyor, more power sources must be used. In an attempt to promote better power transfer to the driven pulleys, idler pulleys have often been added to the drive system to increase the tension on the belt and also to serpentine the belt around the driven pulleys to cause more drive contact therebetween. However, these idler pulleys have been of only limited effectiveness in enhancing the power transfer while dissipating power and reducing the efficiency of the conveyor's drive system.

Positive drive belts and flanged driven pulleys combined with idler pulleys for serpentining the drive belt are proposed for conveyors in Blocker U.S. Pat. No. 5,040,669, but the idler pulleys and serpentine belt arrangement increase the complexity, weight and potential vibration of the conveyor, as well as the power consumption.

SUMMARY OF THE INVENTION

The invention provides a new type of roller conveyor for moving articles along a pathway and has a pair of laterally spaced parallel side walls that extend in the lengthwise direction of the pathway. Each side wall has an inside surface facing the pathway and an outside surface facing away from the pathway.

Each side wall has mounted therein a plurality of driven roller assemblies in spaced relationship along a straight line in the lengthwise direction of the pathway. The assemblies are for supporting the lateral portions of articles moved along the pathway.

Each driven roller assembly comprises a rotatable shaft rotatably mounted in the side wall so that an inner stub shaft section projects inside the side wall and an outer stub shaft section projects outside the side wall. Also, a roller is carried on the inner stub shaft section for rotation with the shaft to move articles resting on the roller along the pathway.

A driven pulley of the roller assembly has axially extending teeth and grooves in its circumferential outer periphery. The outer periphery has a lateral inside edge essentially free of any annular ridge and a lateral outside edge equipped with an annular ridge of a radius at least as great as the radius of the axially extending teeth. The pulley is mounted on the outer stub shaft section of the rotatable shaft in a manner that causes rotation of the shaft with the pulley. The lateral inside peripheral edge of the pulley is adjacent to the outside surface of the side wall.

The conveyor also has an endless positive drive belt with a positive drive surface formed of transverse teeth and grooves for meshing with the axially extending teeth and grooves of the driven pulleys along a straight drive run which is free of guide rollers for the drive belt. The drive belt has a backing surface of substantially smooth character to provide a substantially flat plane along the length of the straight drive run. The drive run of the belt is laterally guided by the side wall along the belt's inside edge and by the annular ridges of the pulleys along its outside edge.

A guide strip has an anti-camming surface that extends in proximate relationship lengthwise over the drive belt backing surface along the length of the drive run. The anti-camming surface serves as an abutment obstructing the drive belt along the drive run from being cammed out of its meshed relationship with the pulleys along the drive run.

In the most preferred form of the roller assemblies, the roller is mounted for slip friction rotation with the shaft but is subject to non-rotation with the shaft when a force obstructing rotation of the roller exceeds the friction effecting rotation of the roller on the rotatable shaft. The endmost roller assembly mounted on a side wall preferably has a driver pulley which drives the drive belt.

The guide strip preferably has a guide surface which is adjacent to the inside surface of the side wall to laterally guide articles moving along the pathway.

The preferred drive belt has filaments therein which extend in the longitudinal direction of the belt. The conveyor also suitably has a guide mounted on the outside surface of a side wall to prevent a return run of the belt from coming into contact with a driven pulley.

Another embodiment of the invention is a transitional roller conveyor for moving articles along a curved pathway between two different conveyor directions. The transitional conveyor features two curved alignments of a plurality of radially oriented bearing mounts in laterally spaced condition. The curved alignments define the approximate width of the curved pathway and are of unequal length. Each curved alignment has an inside overall surface facing the pathway and an outside overall surface facing away from the pathway.

Each curved alignment has a plurality of driven roller assemblies mounted therein, with the longer of the two alignments having a greater number of driven roller assemblies. The roller assemblies are similar to those roller assemblies described above, but employ a dual pulley. The dual pulley is mounted on the outer stub shaft section of the rotatable shaft in a manner that causes rotation of the shaft with the dual pulley. The dual pulley has a driven pulley and a secondary driver pulley and is at an angle with respect to other dual pulleys in the curved alignment of driven roller assemblies.

A drive system for effecting rotation of dual pulleys of the curved alignments comprises a power source for driving at least one primary driver pulley connected by an endless belt to a driven pulley of a the dual pulley. A plurality of endless belts are looped about pairs of dual pulleys on circumferentially adjacent shafts in a manner such that the driving force of the secondary driver pulley of one dual pulley is transmitted to the driven pulley of a circumferentially adjacent dual pulley.

The transitional conveyor also preferably employs a roller mounted for slip friction rotation with the rotatable shaft. Each alignment is suitably comprised of a series of bearing blocks each having a bearing mount therein. The endless belt of the transitional conveyor suitably comprises an O-ring belt.

DESCRIPTION OF THE PREFERRED EMBODIMENTS

Figure 1:
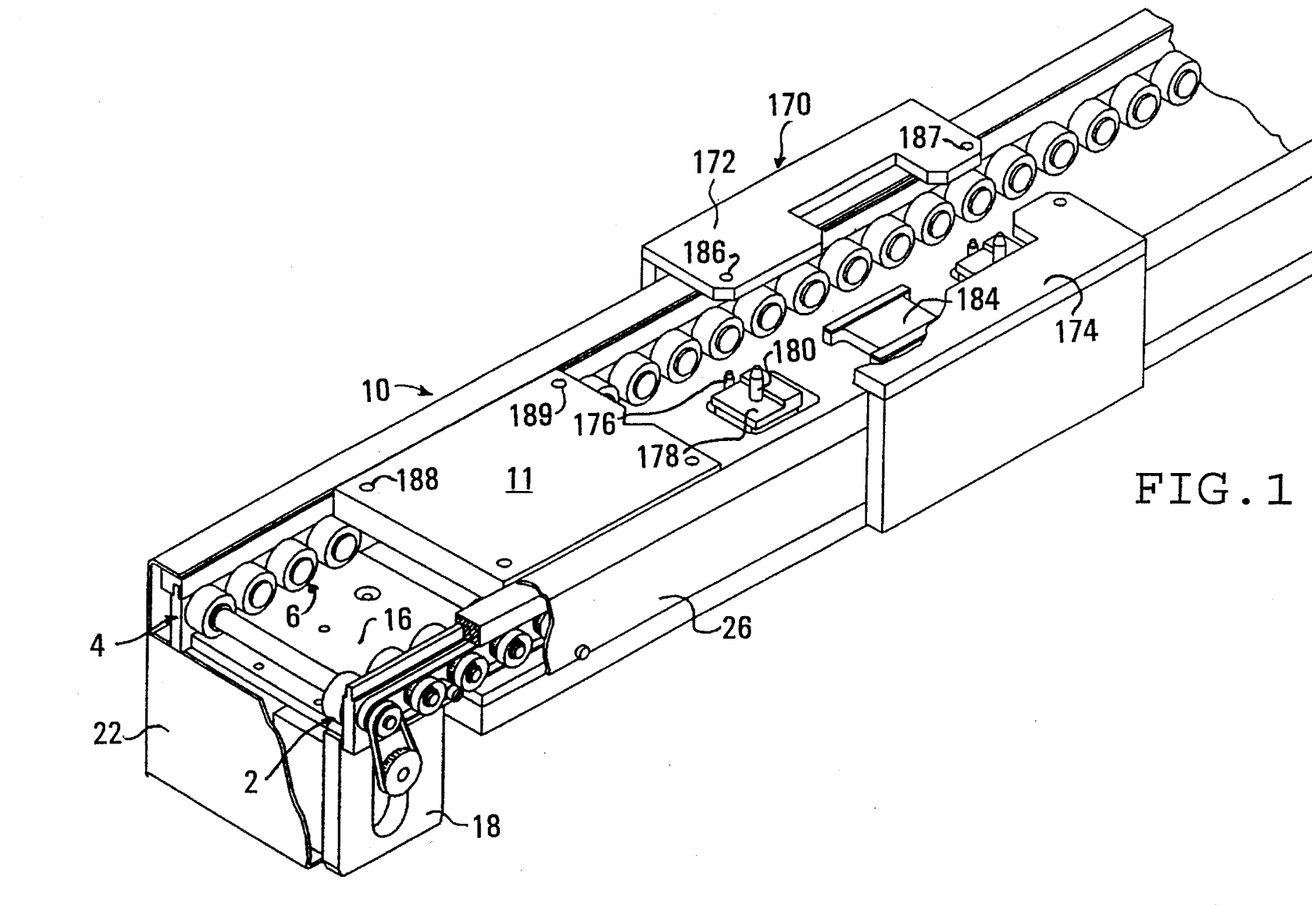
FIG. 1 is a schematic perspective view of one end of a conveyor of the invention equipped with a docking station and having parts broken away to show underlying detail.

As shown in FIG. 1, the roller conveyor system of the invention is generally comprised of opposing banks of roller assemblies mounted on a supporting frame. The banks of roller assemblies support and move articles along a straight conveyor pathway. A docking station may be provided to stop and hold a carrier being transported along the pathway so that various operations can be performed.

The Frame

Figure 2:
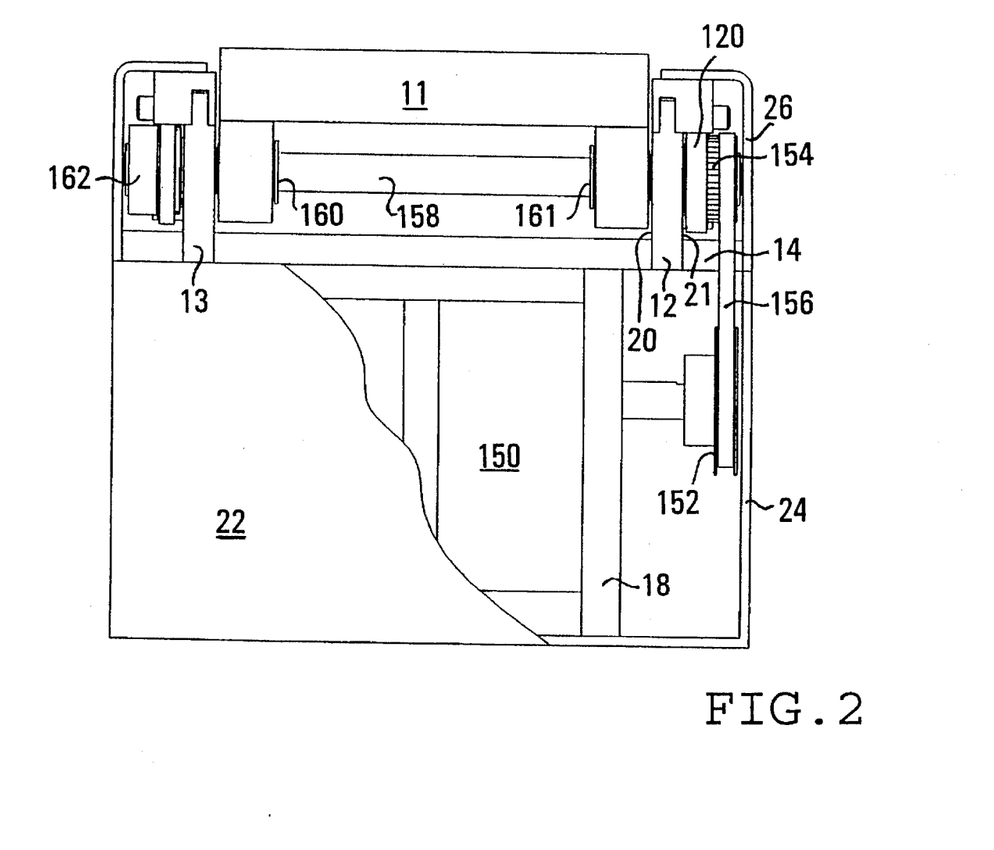
FIG. 2 is a schematic end view of the conveyor with parts broken away to show detail.

The supporting frame of the conveyor 10 (see FIG. 2) generally forms a straight conveyor pathway along which articles such as products or product carriers may be moved. The frame is generally comprised of parallel vertical side walls 12, 13 that extend generally horizontally in the lengthwise or longitudinal direction of the conveyor pathway and form opposite and substantially mirror image sides for the pathway. A support bracket 14 extends laterally outward from the base of each side wall 12 and suitably each side wall and bracket may be formed as a unit from an L-shaped extrusion. The side walls 12, 13 are laterally spaced outwardly from the center of the conveyor pathway and from each other by one or more transverse horizontal spacer plates 16. Support legs 18 may be provided for mounting the drive motor underneath the conveyor. Additional frame structure elements may be employed as required.

The features of each side wall and the components mounted thereon are substantially similar (but oppositely oriented) to those on the opposite wall, and therefore the following description of side wall 12 applies in most essential aspects to side wall 13. Side wall 12 has an inside surface 20 facing the pathway and an outside surface 21 facing away from the pathway. A series of roller assembly mounting holes or bores (e.g, hole 28 shown in FIG. 4) are arranged in a straight line in the lengthwise direction of the pathway. The holes are aligned at the same vertical height, preferably laterally aligned across the pathway with a series of holes in the opposite side wall (i.e., a mounting hole in side wall 12 is across from another mounting hole in wall 13). Additionally, an end cover 22 covers portions of the frame support structure and a safety cover 24 protects portions of the drive train from interference. A protective side cover 26 mounted on support bracket 14 covers other portions of the drive train on the outside of the side wall.

Slip Roller Assemblies

The preferred roller assemblies are slip roller assemblies, although fixed rollers may be employed for an entire conveyor and may be suitably employed at intervals between slip roller assemblies. Fixed rollers lacking the slip property exert an unrelenting drive force on articles supported on them.

Illustratively, a plurality of slip roller assemblies (see FIG. 1) are mounted on each side wall in spaced relationship to each other in a straight line in the pathway's lengthwise direction. The rollers of a side wall are preferably (but not critically) in an opposing relationship to the roller assemblies mounted on the other side wall, so that each side wall has a bank of support rollers capable of supporting a lateral side portion of an article such as a product carrier 11 for movement along the conveyor pathway. Thus, a bank 2 is mounted on the side wall 12 and a bank 4 is mounted on side wall 13 (see FIG. 1). A bank of roller assemblies for a conveyor will usually have a minimum of at least five roller assemblies, although groups of two or three are possible. Between the opposing banks of slip roller assemblies is a substantially unobstructed space where optional components, such as, for example, a docking station may be installed.

Each roller assembly 6 is comprised of a rotatable support shaft, a driven pulley, and a roller, preferably a slip roller. Illustratively, the roller 86 and the pulley 70 are supported on a rotatable shaft 40 (see FIG. 4). The shaft 40 is journalled in a mounting bore or hole 28 in the side wall 12, with an inner stub section 42 of the shaft projecting laterally inside the inside surface 20 of the side wall 12 toward the pathway. An outer stub section 44 of the shaft projects laterally out from the outside surface 21 of the side wall 12 and away from the conveyor pathway. The shaft 40 is suitably supported in the mounting hole 28 by one or more bearings, such as a ball bearing or a sleeve bearing, that will permit free rotation of the shaft in the side wall 12. Illustratively, a set of laterally positioned bearings are mounted in the hole 28, including an inner bearing 46 and an outer bearing 48. A circumferential lip on the outer edge of each bearing (e.g., lip 50 on inner bearing 46) is seated in a counterbore formed in the inside 20 and outside 21 surfaces around the mounting hole 28 (e.g., counterbore 52 on the inside surface 20). The bearings are most preferably conventional ball bearings comprised of a radially inner race in contact with the shaft 40 and an radially outer race in contact with the mounting hole or bore 28, with multiple balls interposed between the inner and outer races. Other forms of shaft bearings may also be suitable, such as sleeve bearings formed of, for example, sintered bronze having oil-filled pores.

Figure 4:
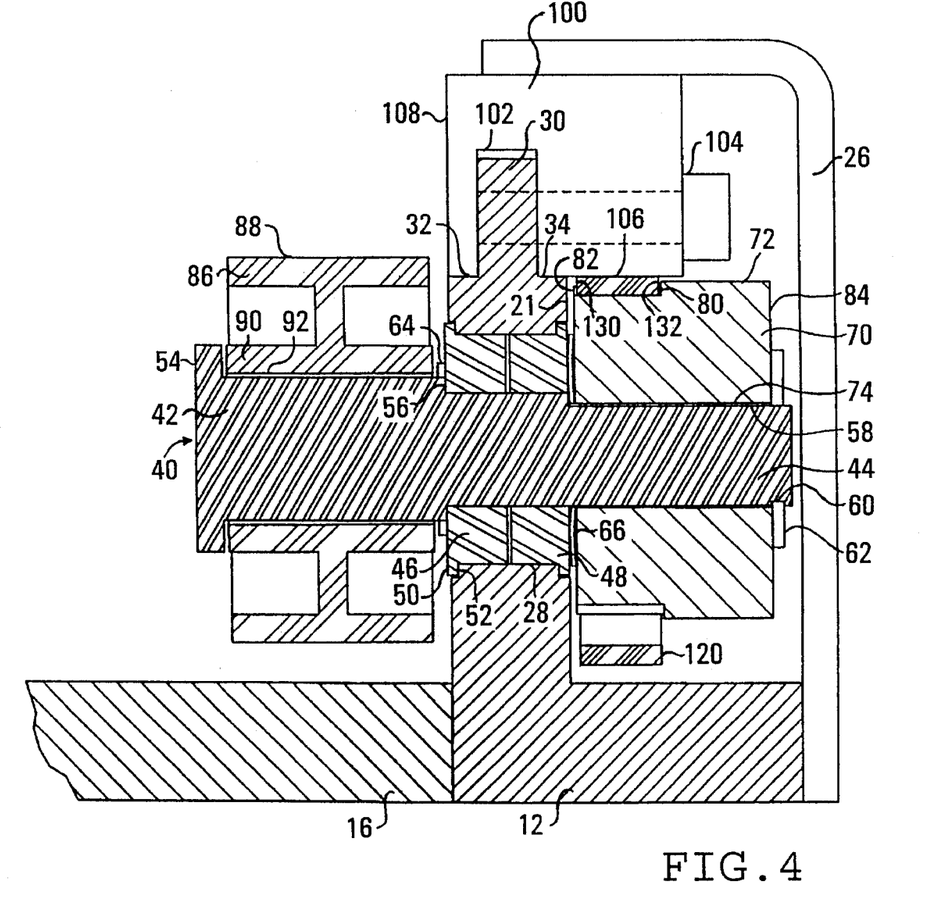
FIG. 4 is a schematic sectional view (taken along line 4—4 in FIG. 3) of a roller assembly of the invention mounted on a broken away portion of the conveyor frame.

An inner washer 64 rides on the support shaft between the slip roller 86 and the inner bearing 46, and an outer washer 66 rides between the outer bearing 48 and the pulley 70. The inner stub section 42 of the shaft preferably has a larger diameter than the rest of the shaft, with an axially locating shoulder 56 on the shaft that may ride or bear against the inner washer 64 and the inner bearing 46. The inner end or terminus 54 of the inner stub section 42 preferably has an integral expanded flange or head that retains the slip roller 86 on the shaft. The end of the shaft's outer stub section 44 has a circumferential groove 60 for receiving a circular retaining clip 62 to limit the axially outward movement of the pulley 70 on the shaft.

The driven pulley 70 (see FIGS. 4 and 5) translates the linear motion of the drive belt 120 to rotational motion of the shaft 40. The pulley 70 has axially extending or transverse grooves (e.g., groove 76) formed in its circumferential outer periphery 72, with transverse teeth (e.g., tooth 78) between adjacent grooves. The outer periphery 72 has a lateral inside peripheral edge 82 and a lateral outside peripheral edge 84. The inside edge 82 is adjacent to the outside surface 21 of the side wall 12 and is essentially free of any annular ridge or flange that would otherwise prevent a belt meshed with the teeth from sliding axially along the teeth toward the wall's outside surface 21. An annular flange or ridge 80 is formed on the pulley's circumferential outer periphery at its lateral outside edge and is most suitably located adjacent to the outer lateral extent of the teeth and grooves. The ridge 80 has a radius at least as great as the radius of the tips (e.g., the radially outermost portions) of the teeth of the pulley. The annular ridge 80 functions as a lateral guide for the outside edge of a belt meshed with the teeth and grooves on the pulley.

The outer stub section 44 of the shaft has a flattened surface 58 which gives the outer stub section 44 a generally D-shaped cross-section. The D-shaped profile of the outer stub section 44 fits into a complementary D-shaped hole 74 in the pulley 70 to fix the pulley so that the shaft can not rotate independently of the pulley. Suitably, cooperating splines or threads on the shaft and pulley may also be used to lock the rotation of the shaft and pulley.

The slip roller 86 is mounted on the inner stub section 42 of the support shaft. The slip roller 86 has a cylindrical outer annular support surface 88 that contacts and supports an article moving along the pathway. The roller 86 also has a inner hub 90 protruding axially beyond the axial extent of the outer support surface 88. The hub 90 functions as a spacer and prevents the outer surface of the roller 86 from coming into contact with the inside surface 20 of the side wall. The central bore 92 through the roller hub 90 has a cylindrical inner annular surface which bears upon the surface of the shaft 40.

In the preferred embodiment, the slip roller 86 has a bore 92 somewhat larger in diameter than the surface of inner stub section 42 of the shaft. As a result, contact between the shaft and the roller is not continuous around the circumference of the shaft and may be limited to an area near the uppermost portions of the shaft. Rotation of the shaft generates friction between the roller bore 92 and the shaft 42 which encourages the roller to rotate with the shaft. The frictional force or effect of the turning shaft on the roller tends to increase in proportion to the downward force applied to the roller (e.g., the weight of an article supported by the roller). Because of the limited contact between the roller and shaft, the roller is able to slip on the rotating shaft even to the extent that the roller does not rotate at all. Thus, if a force obstructing or resisting rotation is applied to the roller and that force exceeds the force of friction between the roller bore 92 and the shaft, the roller will cease rotation and slip on the shaft. Usually, the obstructing force will be the frictional force exerted on the roller's outer annular surface 86 by an article whose forward motion on the pathway has been temporarily arrested. To enhance the slip property of the slip roller, it is preferably formed of a low friction plastic material such as, for example, various forms of nylon sold under the tradenames Delrin or Nylatron.

The spacing between adjacent roller assemblies in the lengthwise direction of the conveyor pathway may vary in different conveyors depending upon factors such as the diameter of the rollers used, the desired weight-supporting capacity of the conveyor, and the size of the articles to be conveyed. The spacing between the shaft centers of the roller assemblies of the illustrative embodiment is about 1 inch or 2–3 centimeters, where the rollers have a diameter of about 0.75 inches (2 cm).

The Drive Belt

An endless drive belt drives or rotates the driven pulleys of a bank of roller assemblies. A positive drive belt 120, illustratively a "timing" belt, transfers the driving force of the belt to the driven pulleys through teeth or other transverse protrusions on the belt, which mesh with similar protrusions on the pulley. A positive drive belt does not rely solely upon a frictional relationship between the belt and the pulleys to transfer power. Therefore, a positive drive belt is less vulnerable to slippage than frictional drive belts, such as V-belts and O-rings, especially when the positive drive belt is maintained in a proper meshing relationship with the pulley.

Figure 5:
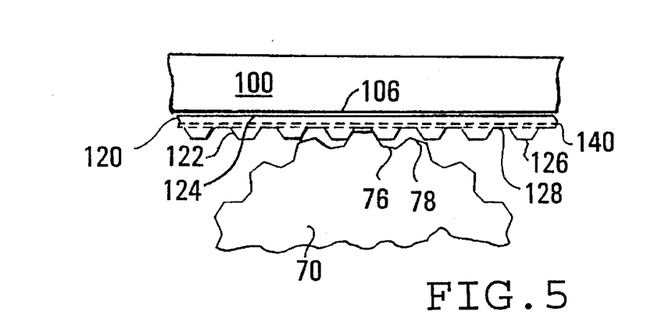
FIG. 5 is a schematic side view of a drive belt meshed with a pulley of the invention, with the view being along the length and limited to a portion of the length.

The illustrative timing belt 120 is an endless loop of belt having a generally rectangular cross-section with opposite surfaces and opposite side edges (see FIGS. 4 and 5). The positive drive surface 122 of the belt most typically faces inwardly and has axial cogs or teeth 126 with grooves 128 formed between the teeth. The teeth and grooves of the belt are suitably sized to properly mesh with the grooves and teeth of the driven pulleys. The teeth (and grooves) preferably extend axially or laterally from the inside edge 130 to the outside edge 132 of the belt, which provides maximum tooth contact with a pulley for the width of the belt employed. Although timing belts are sometimes employed to drive pulleys synchronously (hence the name "timing" belt), complete synchronization of the pulleys is unnecessary for the invention. In fact, synchronization of slip roller assemblies would be difficult in view of the slip relationship between the support shaft and the slip rollers, since the shaft would not reliably transmit the synchronized rotation to the rollers.

A significant feature of the positive drive belt is that the pulley and support shaft of each roller assembly are rotatably driven at substantially the same speed at all locations along the longitudinal length of the conveyor, regardless of the length of a particular conveyor's pathway and the distance between the driver pulley and any driven pulley.

The backing surface 124 opposite the drive surface 122 of the belt is characterized by being substantially smooth and continuous, and most preferably is a flat plane such that the backing surface 124 on the belt's drive run is able to slide smoothly along the anti-camming surface 106 of the guide strip 100 without producing excessive friction.

The timing drive belt 120 is most preferably constructed with cords or filaments 140 (see FIG. 5) that enhance the belt's resistance to longitudinal stretch. The filaments extend perpendicular to the transverse belt teeth and along the longitudinal extent or direction of the loop. The filaments may be arranged substantially contiguous (e.g., side by side) across the width of the belt. In one belt embodiment, the grooves of the belt have smaller mini-grooves (not shown) therein through which the filaments can be seen. These mini-grooves are formed in the belt by ridges in the belt mold used to locate the filaments during the molding of the belt. Significantly, the mini-grooves give the belt greater longitudinal flexibility. The filaments may be comprised of materials such as of the nylon family or an aramide (aromatic polyamide) fiber, such as is available under the tradename Kevlar.

Figure 3:
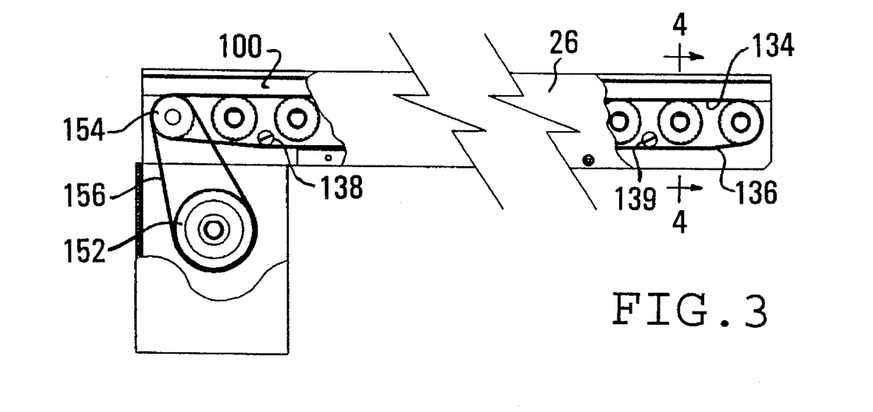
FIG. 3 is a schematic side view of the conveyor with parts removed.

The drive train (e.g., the pulleys and belts) on a side wall is driven by any suitable power source. Illustratively, an electric motor 150 is located below the pathway of the conveyor, such as under the transverse spacer plate 16 (see FIGS. 1, 2, and 3) Preferably, the longitudinally endmost pulley on the bank of roller assemblies functions as a driver pulley for the belt 120. The driver pulley 154 has grooves and teeth of sufficient axial width to accommodate the width of an additional belt besides the drive belt 120. A motor pulley 152 is mounted on the shaft of the motor 150 in lateral alignment with the driver pulley 154, and a separate transfer belt 156 connects the motor pulley to the driver pulley. A portion of the support bracket 14 is preferably removed from side wall 12 to permit passage of the transfer belt 156 between the pulleys. The motor pulley 152 may have suitable annular flanges on both axial sides of its grooves and teeth to guide the transfer belt 156 and keep it from axial movement, or walking, on the periphery of the driver pulley 154. The preferred form of the driver pulley 154 has no annular flanges or ridges to guide the transfer 156 or drive 120 belts. The driver pulley 154 is thus driven by the motor pulley 152 through the transfer belt 156, and drives the drive belt 120, which in turn drives or rotates the bank of pulleys.

In the most preferred embodiment, the opposite banks of roller assemblies are driven by the same power source. Illustratively, the shaft 158 (see FIG. 2) of the endmost or driver pulley 154 is not terminated near the slip roller mounted thereon, but instead extends transversely below the carrier pathway and through the opposite side wall 13. A driver pulley 162 of the opposite bank of roller assemblies is rigidly mounted to the opposite outward end of the shaft 158 in a manner similar to the other roller assemblies. The driver pulley 162 drives the belt and pulleys (e.g., the drive train) of the opposite bank of roller assemblies. Retaining clips 160, 161 are mounted in a groove on the shaft 158 near the inward side of each roller and thus prevent axial movement of the rollers along the extended connecting shaft 158. However, separate power sources could be provided for each bank of roller assemblies.

The driver pulley 154 draws or pulls a drive portion or run 134 of the belt 120 toward itself over the uppermost portions of the driven pulleys, and the belt returns to the opposite end of the bank of pulleys along a path below the driven pulleys. The drive run 134 is substantially straight in the lengthwise direction and preferably meshes only with the teeth and grooves on the uppermost portions of the driven pulleys. The drive run 134 thus remains in a substantially tangential orientation to the circumferential outer periphery of the driven pulleys (except for the endmost pulleys in a bank of roller assemblies).

The return run 136 of the drive belt need not be meshed or otherwise engaged with the pulleys for effective driving of the pulleys and most preferably is kept away from engagement with the pulleys to avoid any possible problems arising from incorrect meshing of the return run with the pulleys' lowermost teeth. In the most preferred embodiment, guides 138 and 139 near opposite ends of the return run 136 prevent the belt from coming into contact with the lowermost portions of the pulleys. The guides are mounted on the side wall 12 in positions away from the teeth on the pulleys, but not so far from the pulleys that tension is imposed on the belt. Illustratively, these guides 138, 139 are cylindrical posts that may have rotating sleeve surfaces that tend to lessen any friction that might result from the belt coming into contact with the guide post. Thus, the return run 136 may be substantially free of tension during operation of the conveyor.

Significantly, the location of moving belts and pulleys of the conveyor outside of the side walls and away from the pathway protects them from interference from articles or from operations performed in the conveyor pathway.

The Anti-Camming Guide Strip

A significant feature of the conveyor is the guide strip 100, which has an anti-camming surface 106 that assures a proper meshed relationship between the drive run 134 of the belt and the driven pulleys.

A guide strip 100 is mounted on each side wall along its longitudinal length (see FIG. 4). The side wall 12, for example, has an upwardly extending longitudinal tongue or ridge 30 with longitudinal shoulders 32, 34 on each lateral side. Ridge 30 fits inside a longitudinal groove 102 in the guide strip to laterally locate the strip. The shoulders 32, 34 may be employed to vertically locate the strip 100 in the correct proximity to the drive belt and driven pulleys. A screw 104 is preferably threaded through the guide strip 100 and into the ridge 30 to prevent longitudinal shift of the strip with respect to the side wall 12.

The guide strip is preferably constructed from a low-friction plastic material such as, for example, ultra high molecular weight (UHMW) polyethylene. The preferred UHMW polyethylene may not be sufficiently rigid or strong enough to maintain the strip 100 in its proper orientation with respect to the drive belt 120 and the pulleys over long conveyor pathway lengths unless multiple fasteners are used to fix the longitudinal length of the strip. A preferred and novel way of holding the strip 100 into its proper position without using a multitude of fasteners is through the action of the rigid side cover 26. The side cover 26 extends vertically upward from its mounting on bracket 14 and then extends laterally inward over a portion of the strip 100. The installation of the side cover 26 prevents the guide strip from moving upward and out of contact with the locating shoulders 32, 34 of the side wall. Removal of the guide strip (such as for changing the drive belt) is thus made exceedingly simple and requires only the removal of a few screws holding the cover 26 in position and the screw 104 passing through the strip into the side wall bracket. A suitably rigid low-friction material could be used for guide strip 100 that would not require the function of side cover 26.

A significant feature of the guide strip 100 is its anti-camming surface 106. The anti-camming surface extends lengthwise along the length of the drive run 134 of belt 120 and is positioned proximate to the belt in a closely spaced or even touching relationship to the backing surface 124 of a drive belt placed in a meshed relationship with the driven pulleys. The body or thickness of the belt 120 is always located or interposed between the anti-camming surface 106 and the teeth 78 of the pulleys 70. When the belt is in a proper meshed relationship with the bank of pulleys, the belt is obstructed from "camming out", or moving out of the meshed relationship with the pulleys by the abutment of the anti-camming surface 106 against the drive belt backing surface 124. "Camming out" of the drive belt on the pulley occurs when the belt moves in a radially outward direction from the pulley. Excessive radial movement by the belt may allow the belt teeth to ride up on the pulley teeth (e.g., out of the pulley's groove). As a result, the belt teeth may then skip or slip over the pulley teeth without imparting the desired amount of rotational motion to the pulley. The proximity of the anti-camming surface 106 to the backing surface 124 obstructs or blocks excessive radial movement by the belt away from the pulley and thereby prevents any substantial unmeshing of the belt from the pulley (and any resulting slippage). In the most preferred relationship, the backing surface 124 of the belt does not have significant contact with the anti-camming surface 106 when the belt is fully meshed with the pulley.

In the preferred embodiment of the invention, the anti-camming surface is substantially flat and smooth along its lateral and lengthwise extents and performs only a radial guidance function with respect to the belt, with no significant lateral guidance provided to the belt. Lateral guidance for the outside edge of belt 100 is provided by the raised annular ridge 80 on the lateral outside peripheral edge of the pulley.

Significantly, lateral belt guidance for the inside edge 82 of the belt is provided by the outside surface 21 of the side wall, which is close enough to the pulley's lateral inside edge 82 to prevent significant axial movement of the belt with respect to the pulley. This feature eliminates the need for an inside edge flange or ridge on the pulley and permits the roller assembly to be more laterally (e.g., axially) compact on the outside of the side wall 12 as compared to a pulley employing two flanges to guide a belt of comparable width. Also, the anti-camming surface 106 may perform its function without any possibility of interference from a pulley inside flange.

Additionally, the most preferred embodiment of the strip 100 provides a lateral guide surface 108 on the inside surface 20 of the side wall 12, for guiding articles moving along the pathway with minimal friction.

It should be emphasized that the drive and return runs of the drive belt are preferably not subjected to any substantial additional tension other than that resulting from the driver pulley 154 acting on the drive belt. This condition is made possible by the combination of the positive drive feature of the endless belt and the anti-camming surface of the invention, and beneficially avoids any need for guide pulleys or other tension-inducing structures, such as idler pulleys, which have been used in the past to promote the transfer of power from the belt to the pulleys. The novel combination also allows longer conveyor segment lengths with a single power source than is normally possible with frictional belt designs.

Carrier Docking Station

The substantially open pathway between the opposing banks of slip roller assemblies permits work stations to be simply integrated into a conveyor segment without specialized or customized changes to the conveyor's structure. For example, a product carrier docking station may be "piggybacked" onto a basic conveyor segment without altering the basic functioning or structure of the conveyor. In the illustrative embodiment, a carrier docking station 170 stops and lifts an individual carrier 11 into an elevated stationary position so that an operation may be performed on a product carried on the carrier. The docking station 170 is comprised of opposing horizontally cantilevered docking plates 172 and 174 that extend over the opposite side walls of the conveyor toward each other and substantially over the slip roller assemblies. The plates 172, 174 do not meet in the middle of the pathway, but extend far enough that the innermost reaches will intercept or block the outer lateral portions of a carrier as it is raised up and off the roller assemblies.

A metering stop 178 mounted just upstream of the docking station and between the opposing banks of roller assemblies includes a stop pin 180 mounted on a pneumatic ram below the pathway (not shown) that raises the stop pin into a position where it can arrest or block forward movement of a carrier. The stop pin 180 may be cushioned by a suitable shock absorber to prevent impact with the stop pin from excessively jarring the carrier 11. As the carrier 11 arrives at the raised stop pin 180, a sensor 176 mounted adjacent to the metering stop 178 senses the presence of the carrier. A preferred sensor is constructed with fiber optic materials and has an integral light source and light detector to detect light reflected off of a carrier 11 passing above the sensor. If the docking station is able to receive the carrier (e.g., no other carrier is at the docking station), the metering stop ram retracts the stop pin 180 to allow the carrier to proceed into the docking station 170. Another sensor and metering stop are mounted just inside the downstream end of the docking station to stop the carrier in the appropriate position in the station for lifting. Situated below the docking plates 172, 174 of the station is an elevating ram 184 that may be raised above the top of the roller assemblies to lift the carrier off the slip rollers and into contact with the docking plates. The docking plates have locating pins 186, 187 (illustratively shown only on the docking plate 172) with conical ends that depend from the bottom of the plates. The pins 186 and 187 insert into similarly sized locating holes 188 and 198 in the upper surface of the carrier as the carrier is raised. These pins serve to accurately locate and rigidly hold the carrier against lateral movement when it is docked. Operations may be performed upon articles carried on the carrier at this point. When such operations are finished, the elevating ram 184 is lowered and the carrier comes to rest on the slip rollers. The docking station metering stop pin is then lowered and the carrier moves on the slip rollers along the pathway. If a carrier should arrive at the docking station while another carrier is docked, the stop pin 180 will hold the carrier outside the docking station until the docked carrier has cleared the station.

Curved Conveyor

For conveyor arrangements requiring a transitional conveyor having a curved pathway for moving articles between two different or non-aligned conveyor directions, a more suitable embodiment of the conveyor of the invention employs similar roller assemblies to the aforedescribed conveyor with modifications of the pulleys and belts employed in the drive system.

The transitional roller conveyor (see FIG. 6) is comprised of an outer curved alignment 200 of a plurality of radially oriented bearing mounts, and an inner curved alignment 240 of a plurality of radially oriented bearing mounts. In the preferred embodiment, each bearing mount is located in a separate or discrete bearing block, such as an outer bearing block 202 in the outer alignment 200 and an inner bearing block 242 in the inner alignment 240. The bearing mount is formed by a bore in the bearing block that is suitable for journalling a shaft of a roller assembly therein. A series or sequence of adjacent bearing blocks are arranged in an alignment that in most cases will approximate an arc or portion of a circumference of a circle. Generally, each bearing block of a curved alignment is positioned so that the axis of the bearing mount (e.g., the axis of a roller assembly shaft journalled in the bearing mount) is essentially perpendicular to a tangent to the curve or arc of the alignment at that position. The axes of a sequence of adjacent bearing mounts in the inner and outer alignments will preferably converge at a common point, or center of curvature for the alignment, so that the bearing mounts are located on axes radiating from that center point. The cumulative surfaces of the individual bearing blocks located along the inner and outer alignments thus present an inside overall surface for each alignment that faces toward the pathway and an outside overall surface for each alignment that faces away from the pathway. For example, the inner alignment 240 has an inside overall surface 236 and an outside overall surface 238.

Figure 6:
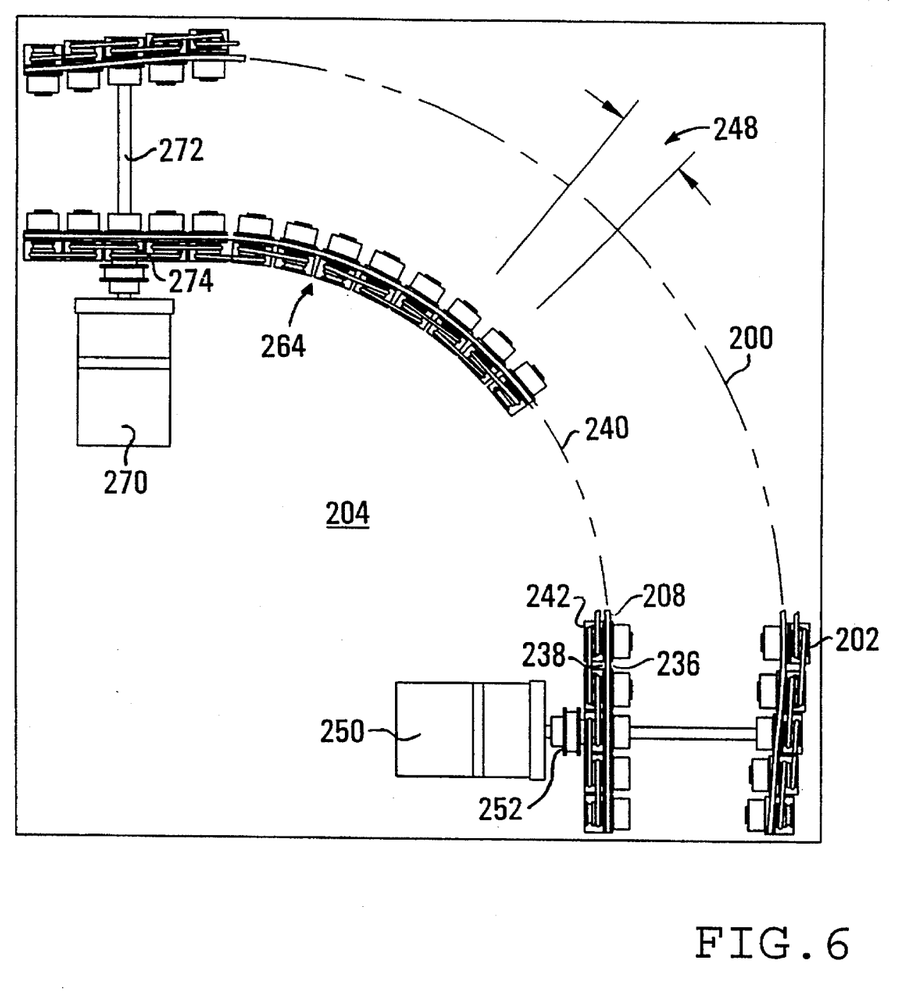
FIG. 6 is a schematic top view of a curved pathway conveyor of the invention and having parts broken away.

The outer 200 and inner 240 curved alignments are in a laterally spaced condition from each other such that the distance between the alignments approximates the width of the conveyor pathway. Thus the outer alignment 200 will have a longer length than the inner alignment 240. The distance or spacing between the inner and outer alignments is determined in large part not only by the width, but also the length of the articles to be moved on the pathway. While the shape or configuration of the inner alignment generally follows that of an arc of a circle (e.g., the points on the inner alignment are equally radially distant from a common center point), the spacing of the outer alignment from the inner alignment will vary on a particular pathway. The spacing between the alignments is essentially determined by the lateral clearance necessary to pass an article of the desired width and length through the pathway as one lateral edge of the article is moved along the inside overall surface 236 of the inner alignment. The line or arc traced by the opposite lateral edge (or the corners on the opposite lateral edge) of the article will in most cases establish the best position for the outer curved alignment.

Each of the curved alignments has a plurality of roller assemblies mounted therein. The outer alignment 200 may have a greater number of roller assemblies than the inner alignment 240 if the same spacing between bearing mounts is employed in both the inner and outer alignments. In the preferred embodiment, each roller assembly is mounted in a bearing mount on a bearing block. Outer bearing block 202 (see FIG. 9) will be described as illustrative of essentially all inner and outer bearing blocks. The outer bearing block 202 is preferably mounted on a substantially horizontal foundation or base plate 204 by means of anchor fasteners, such as anchor screw 206. A low friction lateral guide strip 208 is located at the top of the bearing blocks in the inner and outer alignments to provide lateral guidance to articles moving along the curved pathway.

A roller assembly is mounted in a bearing mount hole or bore 210 of bearing block 202. One or more bearings or journals suitable for supporting a roller assembly may be used, such as the inner 212 and outer 213 bearings. The roller assemblies are substantially similar to those described for the embodiment of the straight pathway conveyor described herein and will only be illustratively described as shown on bearing block 202.

The illustrative roller assembly comprises a shaft 214 mounted for rotation in the bearings 212, 213 and a slip roller 216 mounted on the inner stub section of the shaft 214. A dual pulley 218 is mounted to rotate with the outer stub section of the shaft 214. Because the axes of adjacent bearing mounts are at an angle to each other, the axes of the dual pulleys of adjacent roller assemblies are also at an angle to each other and the grooves of adjacent pulleys are not parallel (as they would be if the axes were substantially parallel). The angle 248 (see FIG. 6) between adjacent bearing mounts will vary depending upon factors such as the radius of curvature of the alignment, the diameter of the rollers used, the overall curvature of the pathway, among other factors. Illustratively, roller assemblies with rollers that are about 0.75 inches (2 cm) in diameter, with shafts that are spaced about 1 inch (2.5 cm) apart, located on an alignment with a radius of curvature of about 13 inches (33 cm) may suitably have an angle of about 6 degrees between adjacent bearing mounts.

The drive system employed to effect rotation of the roller assemblies of the curved conveyor pathway will use one or more power sources, most preferably an electric motor.

Figure 9:
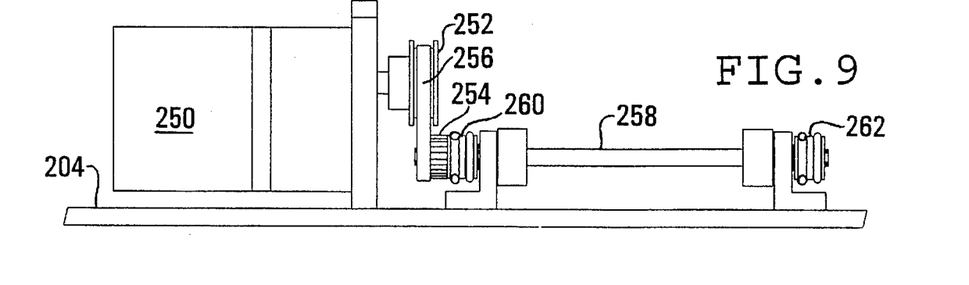
FIG. 9 is a schematic end view of one end of the curved pathway conveyor showing details of one drive system.

A motor 250 is mounted on the base plate 204 of the corner conveyor (see FIG. 9). The shaft of the motor 250 has a motor pulley 252 mounted thereon. An intermediate pulley 254 is fixedly mounted on a primary shaft 258 of a roller assembly mounted in the inner alignment 240. A transfer belt 256 transfers power between the motor pulley 252 and the intermediate pulley 254. Also mounted on the primary shaft 258 is a primary driver pulley 260, preferably located between the intermediate pulley 254 and the inside overall surface 236. The primary shaft 258 extends transverse to and beneath the conveyor pathway to the outer alignment 200 of mounting blocks to thereby connect the drive systems of the inner and outer alignments. The shaft 258 extends through a bearing mount in a bearing block of the outer alignment, with a primary driver pulley 262 for the outer alignment is fixed to the primary shaft 258 to drive a sequence of pulleys on the outer alignment.

The drive system of the conveyor employs a plurality of endless belts that are looped or entrained about pairs of dual pulleys that are mounted on circumferentially adjacent roller assembly shafts.

A significant feature of the drive system is the use of a plurality of endless belts to drive pairs of circumferentially adjacent dual pulleys mounted on the shafts of roller assemblies. A primary driver pulley (e.g., pulley 260) drives a dual pulley circumferentially adjacent to it. Each dual pulley is paired by a belt with an adjacent dual pulley on one circumferential side, and is also paired by another belt with the adjacent dual pulley on the other circumferential side. Pulleys linked together in this manner thus form a chain or sequence of pulleys, beginning with a primary driver pulley which is driven by the power source and ending with an endmost pulley, which does not pass on the rotation. The intervening pulleys are driven by one neighboring pulley and drive the opposite neighboring pulley.

Illustratively, a dual pulley 218 of the preferred embodiment has two axially spaced and coaxial pulleys (see FIG. 8), which are preferably unified but could comprise separate pulleys if both are mounted so that they must rotate together.

Figure 8:
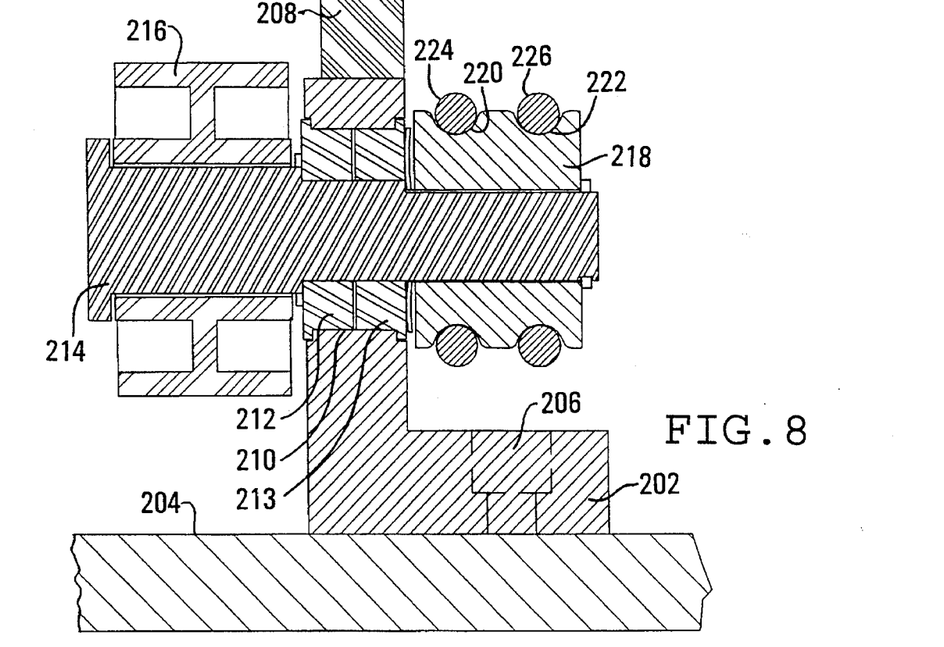
FIG. 8 is a schematic sectional view (taken along line 8—8 in FIG. 7) of a roller assembly in its bearing block of the curved pathway conveyor and includes its dual pulley.

The dual pulley 218 has an inner groove 220 functioning as one pulley and an outer groove 222 functioning as another pulley. The inner groove 220 has an inner belt 224 looped or entrained about it and the outer groove 222 has an outer belt 226 looped about it.

Figure 7:
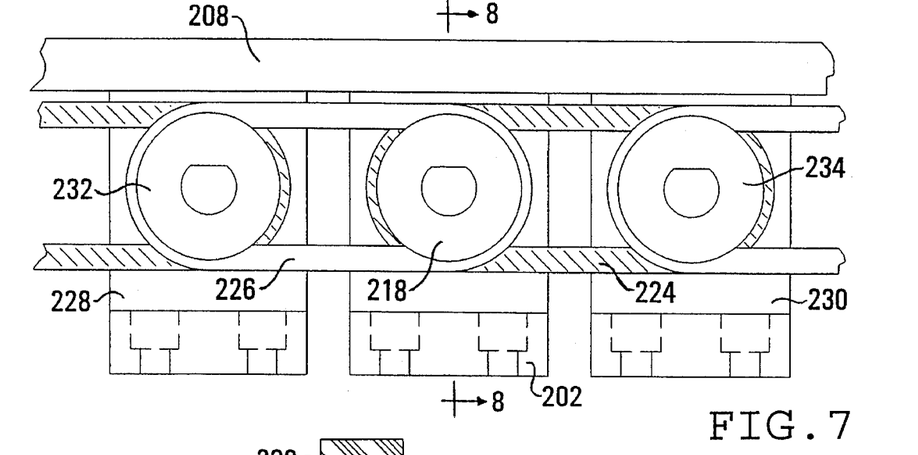
FIG. 7 is a schematic side view of bearing blocks of the curved pathway conveyor having roller assemblies driven by paired O-rings.

The inner 224 and outer 226 belts on pulley 218 are each also individually looped about the dual pulleys of bearing blocks circumferentially (i.e., along a curved alignment) adjacent or neighboring to bearing block 202 (see FIG. 7). Illustratively, the bearing block 228 is nearer to the primary driver pulley than (i.e., upstream from) block 202 and supports an upstream pulley 232. The bearing block 230 is further away from the primary driver pulley than (e.g., downstream from) block 202 and supports has a downstream dual pulley 234. The outer belt 226 is thus looped about the dual pulleys 218 and 232 of blocks 202 and 228, respectively, and the inner belt 224 is looped about the dual pulleys 218 and 234 of blocks 202 and 230, respectively. The outer belt 226 is driven by the dual pulley 232 (acting as a secondary driver pulley) and drives the dual pulley 218 through its outer groove 222. Similarly, the rotation imparted to the dual pulley 218 through outer groove 222 causes the inner groove 220 (acting as a secondary driver pulley) to drive inner belt 224, which in turn drives the dual pulley 234 mounted on the block 230. This pattern is repeated among the paired dual pulleys throughout the sequence of pulleys driven by a particular driver pulley. In a more general sense, a pair of dual pulleys looped with the same belt will have the secondary driver pulley upstream (e.g., closer to the primary driver pulley) and the driven pulley downstream.

The preferred form of endless belt for the invention is an O-ring belt which has a circular cross section and is highly suitable for being looped or entrained about a pair of pulleys which have axes at an angle to each other (e.g., the pulleys do not have parallel pulley grooves). Other belt types may also be suitable for use with the dual pulleys, but they should be capable of operating on angled pulleys without coming out of the grooves.

Significantly, the sequential pairing of pulleys by endless belts allows for the most effective transfer of power between a sequence of pulleys without the use of guide or idler pulleys (or other devices) that are typically used to increase the tension in a drive belt and to increase the amount of contact between a belt and a pulley. Usage of endless belts looped about pairs of pulleys produces a greater degree of belt-to-pulley contact than serpentine arrangements and maintains sufficient tension in the belts without needing to resort to the use of idler pulleys.

Where the number of pulleys in a sequence exceeds the number that can be driven effectively by one power source, an additional power source may be needed to drive a separate sequence of pulleys. Illustratively, a second motor (see FIG. 6) is employed to drive a second sequence of pulleys in each alignment via a second primary shaft 272 and a second primary driver pulley 274. The motors 250 and 270 each drive a sequence of pulleys in each of the inner and outer alignments. The first motor's sequence and the second motor's sequence will meet at a point in the alignment, a break or split point 264 where there is a break in the sequence of endless belts.

Although a plurality of separate or distinct bearing blocks is preferred, an alignment of bearing mounts could be formed by a single continuous strap of material shaped to follow or approximate the arc or curvature of the alignment, with the bearing mounts being subsequently formed into the continuous strap.

It is believed that those skilled in the art will readily recognize that this invention may be embodied in still other specific forms than illustrated without departing from the spirit or essential characteristics of it. The illustrated embodiment is therefore to be considered illustrative and not restrictive, the scope of the invention being indicated by the appended claims rather than the foregoing description; and all variations that come within the meaning and range of equivalency of the claims are intended to be embraced thereby.

That which is claimed is:

1. A roller conveyor for moving articles along a pathway, said conveyor comprising:

A) a pair of laterally spaced parallel side walls extending in the lengthwise direction of said conveyor pathway, each said side wall having an inside surface facing said pathway and an outside surface facing away from said pathway, B) each said side wall having mounted therein a plurality of driven roller assemblies in spaced relationship along a straight line in the lengthwise direction of said pathway, said assemblies being for supporting the lateral portions of articles moved along said pathway, each said driven roller assembly comprising:

i) a rotatable shaft rotatably mounted in the side wall so that an inner stub shaft section projects inside the side wall and an outer stub shaft section projects outside the side wall, ii) a roller carried on said inner stub shaft section of said rotatable shaft for rotation therewith to move articles resting on said roller along said pathway, iii) a driven pulley having axially extending teeth and grooves in its circumferential outer periphery, said outer periphery having a lateral inside edge essentially free of any annular ridge and a lateral outside edge equipped with an annular ridge of a radius at least as great as the radius of said axially extending teeth, said pulley being mounted on said outer stub shaft section of said rotatable shaft in a manner that causes rotation of said shaft with said pulley, said pulley having its lateral inside peripheral edge adjacent the outside surface of the side wall, C) an endless positive drive belt having a positive drive surface formed of transverse teeth and grooves for meshing with the axially extending teeth and grooves of said driven pulleys along a straight drive run free of guide rollers for said drive belt along said straight drive run, and a backing surface of substantially smooth character such that said backing surface provides a substantially flat plane along the length of said straight drive run, said drive run of said drive belt being laterally guided by said conveyor side wall along its inside edge and by the annular ridges of said pulleys along its outside edge, and D) a guide strip having an anti-camming surface extending in proximate relationship lengthwise over said drive belt backing surface along the length of said drive run, said anti-camming surface being such that it serves as an abutment obstructing said drive belt along said drive run from being cammed out of its meshed relationship with said pulleys along said drive run.

2. The conveyor of claim 1 wherein the roller of each said driven roller assemblies is mounted for slip friction rotation with said shaft but is subject to non-rotation with the shaft when a force obstructing rotation of said roller exceeds the friction effecting rotation of said roller on said rotatable shaft.

3. The conveyor of claim 1 wherein said guide strip has a guide surface adjacent to the inside surface of said side wall for laterally guiding articles moving along said pathway.

4. The conveyor of claim 1 wherein the backing surface of said drive belt is not in contact with said anti-camming surface when said belt is fully meshed with said driven pulley.

5. The conveyor of claim 1 wherein the inner stub shaft section of said shaft has an integral flanged head for retaining said roller on said shaft.

6. The conveyor of claim 1 wherein said drive belt has filaments therein extending in the longitudinal direction of said belt.

7. The conveyor of claim 1 wherein the drive run of said drive belt is maintained in a substantially tangential orientation to the outer periphery of a said driven pulley.

8. The conveyor of claim 1 wherein said drive belt has a return run, said conveyor additionally comprising a guide mounted on the outside surface of a said side wall to prevent said return run from coming into contact with a driven pulley.

9. The conveyor of claim 1 wherein an endmost roller assembly mounted on a said side wall has a driver pulley which drives said drive belt.

10. The conveyor of claim 9 wherein said driver pulley is mounted on a connecting shaft extending across said pathway and through a said mounting hole in the opposite said side wall, a second drive pulley being mounted on said connecting shaft adjacent to the outside surface of the opposite said side wall to drive the drive belt which drives the driven roller assemblies mounted on the opposite said side wall.

11. A transitional roller conveyor for moving articles along a curved pathway between two different conveyor directions, said transitional conveyor comprising:

A) two curved alignments of a plurality of radially oriented bearing mounts in laterally spaced condition such that said spaced curved alignments define the approximate width of said curved pathway, one said curved alignment being a radially outer curved alignment and the other said curved alignment being a radially inner curved alignment, said inner curved alignment having a greater length than said inner curved alignment, the spacing between adjacent bearing mounts of said outer curved alignment being substantially equal to the spacing between adjacent bearing mounts of said inner curved alignment such that said outer curved alignment has a greater number of said bearing mounts than said inner curved alignment, each said curved alignment having an inside overall surface facing said pathway and an outside overall surface having away from said pathway, B) each said curved alignment having mounted therein a plurality of driven roller assemblies, each said driven roller assembly comprising:

i) a rotatable shaft rotatably mounted in a said bearing mount of said curved alignment so that an inner stub shaft section projects inside the curved alignment and an outer stub shaft section projects outside the curved alignment, each said rotatable shaft in said curved alignment being at an angle with respect to other said rotatable shafts in said curved alignment, ii) a roller carried on said inner stub shaft section of said rotatable shaft for rotation therewith to move articles resting on said roller along said pathway, said roller being mounted for slip friction rotation with said shaft but subject to non-rotation with the shaft when a force obstructing rotation of said roller exceeds the friction effecting rotation of said roller on said rotatable shaft, and iii) a dual pulley mounted on said outer stub shaft section of said rotatable shaft in a manner that causes rotation of said shaft with said dual pulley, said dual pulley being located adjacent to the outside overall surface of the curved alignment in which said roller assembly is mounted, said dual pulley comprising a driven pulley and a secondary driver pulley, said dual pulley being at an angle with respect to other said dual pulleys in said curved alignment of driven roller assemblies, and C) a drive system for effecting rotation of dual pulleys of said curved alignments, said drive system comprising at least one primary driver pulley in each said curved alignment, a primary shaft extending transversely beneath said conveyor pathway and having a said primary driver pulley of each said curved alignment mounted thereon, each said curved alignment having its primary driver pulley connected by an endless belt to a driven pulley of a said dual pulley of the curved alignment, a power source for driving at least one said primary driver pulley on said primary shaft to thereby rotate each said primary driver pulley on said primary shaft at the same speed so that the dual pulleys connected to the primary driver pulley in each said curved alignment are rotated at substantially the same speed, and a plurality of endless belts looped about pairs of said dual pulleys on adjacent shafts of the curved alignment in a manner such that the driving force of the secondary driver pulley of one said dual pulley is transmitted to the driven pulley of an adjacent said dual pulley.

12. The transitional conveyor of claim 11 wherein each said curved alignment comprises a series of discrete bearing blocks each having a said bearing mount therein, said transitional conveyor additionally comprising means alone each said curved alignment for providing lateral guidance to articles moving along said curved pathway, each said means consisting essentially of a lateral guide extending as a strip on top of each discrete bearing block of the curved alignment.

13. The transitional conveyor of claim 11 wherein a said alignment is comprised of a series of discrete bearing blocks each having a said bearing mount therein.

14. The transitional conveyor of claim 11 wherein a said endless belt comprises an O-ring belt.

15. The transitional conveyor of claim 11 wherein said primary shaft carries a primary driver roller thereon for each said curved alignment.

* * * * *